United States Patent [19]

Breysse et al.

[11] Patent Number: 5,248,648
[45] Date of Patent: Sep. 28, 1993

[54] HYDROREFINING CATALYST CONTAINING SULPHIDES OF RUTHENIUM AND OF AT LEAST ONE OTHER METAL ON A REFRACTORY

[75] Inventors: Michèle Breysse, Caluire; Jacek Orlewski, Villeurbanne; Thierry des Courieres, Lyons; Michel Vrinat, Caluire, all of France

[73] Assignee: Elf France, Courbevoie, France

[21] Appl. No.: 904,379

[22] Filed: Jun. 25, 1992

[30] Foreign Application Priority Data

Jun. 26, 1991 [FR] France ................. 91 07876

[51] Int. Cl.$^5$ .................. B01J 27/045; B01J 27/043; C10G 45/06; C10G 45/10
[52] U.S. Cl. .................. 502/223; 208/215; 208/217; 208/254 H
[58] Field of Search ............... 502/223, 327; 208/215, 208/217, 254 H

[56] References Cited

U.S. PATENT DOCUMENTS

| | | | |
|---|---|---|---|
| 3,297,564 | 1/1967 | Peck et al. | 502/223 X |
| 3,840,389 | 8/1974 | Kobylinski et al. | 502/223 X |
| 4,107,083 | 8/1978 | Adams et al. | 502/223 |
| 4,115,463 | 9/1978 | Murtha | 502/230 X |
| 4,279,737 | 7/1981 | Chianelli et al. | 208/217 |
| 4,358,399 | 11/1982 | Antos | 502/327 X |
| 4,469,812 | 9/1984 | Sorrentino et al. | 502/327 X |

FOREIGN PATENT DOCUMENTS 1565754 4/1980 United Kingdom.

Primary Examiner—W. J. Shine
Assistant Examiner—Douglas J. McGinty
Attorney, Agent, or Firm—Burgess, Ryan & Wayne

[57] ABSTRACT

This invention relates to a hydrorefining catalyst containing ruthenium sulphide and cobalt and/or nickel sulphide on a refractory oxides support. These catalysts are only very slightly inhibited by polyaromatic compounds or hydrogen sulphide.

15 Claims, No Drawings

HYDROREFINING CATALYST CONTAINING SULPHIDES OF RUTHENIUM AND OF AT LEAST ONE OTHER METAL ON A REFRACTORY

BACKGROUND OF THE INVENTION

1. Field of the Invention

The relates to a hydrorefining catalyst containing suphides of ruthenium and of at least one other metal and a process for hydrorefining hydrocarbon feedstocks using the said catalyst.

2. Background Art

Petroleum and petroleum fractions obtained by distillation or oil processing are complex mixtures in which, besides hydrocarbons, there are compounds containing heteroatoms, such as sulphur, nitrogen and oxygen. Heavy feedstocks, the use of which is becoming increasingly widespread, contain large quantities of heteroatomic compounds. These heavy feedstocks consist, for example, of heavy crudes, of bituminous schists or of heavy residues from oil refineries.

Heteroatomic compounds are impurities which are detrimental to the good quality of petroleum products. They are responsible especially for problems related to pollution, corrosion, odour and stability. Sulphur and nitrogen compounds can also poison the usual catalysts in the refining processes.

It is therefore important to remove them in the course of refining. This generally involves a treatment with hydrogen in the presence of a catalyst which promotes the rupture of carbon-heteroatom bonds. This treatment is known as hydrorefining.

The main hydrorefining reactions are desulphurisation, denitrogenation and the saturation of aromatic compounds. Desulphurisation consists in converting the sulphur present in the organic compounds into hydrogen sulphide. Denitrogenation consists in converting the nitrogen in the organic compounds into ammonia.

A considerable research effort has been deployed to find efficient hydrorefining catalysts which resist deactivation by heteroatoms.

The most commonly employed hydrorefining catalysts are bimetallic catalysts based on nickel, molybdenum, tungsten or cobalt. These metals are deposited on supports by impregnation with the aid of their water-soluble salts, and are then converted into sulphides. The supports are generally based on refractory oxides such as alumina or silica-aluminas.

Among the bimetallic hydrorefining catalysts we can mention the catalysts based on nickel/molybdenum and cobalt/molybdenum. The Procatalyse catalyst HR 346 contains nickel/molybdenum on alumina, and the HR 348 nickel/molybdenum on doped alumina.

It is known that these commercial catalysts result in quite easy conversion of quinolines to alkylanilines, but the latter, although readily denitrogenated when pure, are only very slightly converted in the presence of quinolines. An accumulation of alkylanilines therefore takes place in the feedstocks, and this at present constitutes one of the chief limitations of the denitrogenation efficiencies obtained in refining.

SUMMARY OF THE INVENTION

We have now found a new hydrorefining catalyst, which is very little inhibited by the presence of polyaromatic compounds. Its catalytic effect on the nitrogenation of an alkylaniline, such as diethylaniline, decreases only very slightly in the presence of quinoline. This remains true even under mild operating conditions.

The catalyst according to the invention is also efficacious as a catalyst for the hydrogenation of aromatic compounds. In this application it is much less sensitive to the inhibiting effect of hydrogen sulphide than are commercial catalysts. Its use therefore becomes highly advantageous at high hydrogen sulphide pressures.

The catalyst for hydrorefining hydrocarbon feedstocks according to the invention is characterised in that it contains sulphides of ruthenium and of at least one other metal on a refractory oxides support.

DESCRIPTION OF THE PREFERRED EMBODIMENT

The catalyst contains between 1 and 15% by weight and preferably between 5 and 10% by weight of metal.

The metals which accompany ruthenium are generally cobalt and nickel.

The catalyst is generally bimetallic and preferably contains ruthenium and nickel sulphides.

It is characterised by the atomic ratio of the two metals. This ratio (r) is defined as follows: r = content of atoms of the second metal/content of atoms of the second metal + content of atoms of ruthenium.

In the case of a bimetallic catalyst this ratio (r) is between 0.05 and 0.95 and preferably between 0.1 and 0.7. The ratio is advantageously between 0.2 and 0.6.

Among the refractory oxides there may be mentioned aluminium, zirconium and titanium oxides or mixtures thereof.

Aluminium oxides, such as the various aluminas, are preferably employed.

The catalysts according to the invention can be employed by themselves as hydrorefining catalysts. It may be advantageous, however, to employ them in combination with conventional hydrorefining catalysts based on refractory oxides and/or zeolites.

The catalysts are prepared by successive impregnations of the refractory oxide with solutions of metal salts. The process is generally carried out without excess solution. The impregnation may follow any order, but it is preferable to impregnate the support first of all with a solution of a ruthenium salt. Aqueous solutions are preferably employed. Among the water-soluble salts of ruthenium we can mention ruthenium trichloride and hexaaminoruthenium. The impregnation generally takes place at room temperature. The product obtained is simply dried and the second impregnation is then carried out using a solution of the second metal component. If the second component is nickel, a solution of nickel chloride, for example, may be employed. The catalyst support containing the two metal salts is dried.

Before use the catalyst is sulphided with a gas mixture containing hydrogen sulphide. This is generally a mixture of hydrogen sulphide with hydrogen or nitrogen. The sulphiding generally takes place in the hydrorefining reactor.

Catalysts according to the invention are efficacious in hydrorefining reactions such as desulphurisation, denitrogenation or hydrogenation. Their catalytic effect decreases only very slightly in the presence of polyaromatic compounds such as quinolines. Their hydrogenating effect is also little inhibited by hydrogen sulphide.

The operating conditions for the use of the catalysts according to the invention are those usually employed in hydrorefining processes. The temperature is between 250° and 500° C.

The liquid space velocity of the feedstock, expressed in m³ of liquid feedstock per hour and per m³ of catalyst is generally between 0.02 and 6 h⁻¹.

The total pressure is generally between 1 and 80 bars.

The following examples illustrate the invention without, however, limiting it.

EXAMPLE 1

Catalyst Preparation 10 g of GFS-200 alumina (Procatalyse) ground, screened (0.08 mm–0.125 mm fraction) and dried under vacuum overnight at 110° C. It is impregnated without excess solution with 2 g of $RuCl_3.3H_2O$ (Aldrich Chemie) in aqueous solution. No residual solution therefore remains. The impregnated support is left for a few hours at room temperature with the aim of permitting diffusion into the pores.

The product is dried in air at 110° C. overnight in order to remove part of the water remaining in the pores.

The nickel is introduced by impregnating the dry catalyst with a solution of 0.48 g of $NiCl_2$ (Merck) by following the same procedure as in the case of ruthenium.

The solid is dried in air at 110° C. overnight.

Before use this solid is sulphided with a mixture of hydrogen sulphide and nitrogen containing 15% of hydrogen sulphide. The reaction takes place at 600° C. for 4 hours. The rate of temperature rise is 0.16 ° C. s⁻¹, the volumetric flow rate is $1.1 \times 10^{-6}$ m³ s⁻¹.

The total metal content is 7% by weight. The atomic composition of the catalyst is shown by the atomic ratio (r).

$$r = \frac{\text{content of Ni atoms}}{\text{Content of Ni atoms + content of Ru atoms}}$$

$r = 0.44$.

We have prepared catalysts with a variable (r) using the same procedure.

EXAMPLE 2

During the hydrotreatment of heavy or intermediate cuts of the products of distillation of the crude an accumulation of alkylanilines has been observed in the effluents. This was attributed to the inhibition of the HDN of the alkylanilines formed during the first C-N scission by the polycyclic compounds initially present in the feedstock. The test employed simulates this phenomenon with model molecules on a micropilot scale. The inhibition of the HDN of 2,6-diethylaniline by variable quantities of quinoline is thus investigated. The reaction is carried out in gaseous phase in a dynamic microreactor operating under pressure.

The whole of the plant, under elevated hydrogen pressure, is thermally insulated. The feed takes place at constant flow rate and at a pressure determined by the total reaction pressure. The reactant charges (solvent + DEA + quinoline) and the sulphiding mixture feed 2 Gilson metering pumps which make it possible to work at a variable flow rate. The reaction products in gaseous form are decompressed to atmospheric pressure by means of a pneumatically operated control valve. The analyses are carried out in line using a flame ionisation chromatograph.

After sulphiding we cooled the catalyst bed to protect the catalyst before beginning the test. As soon as we obtained the temperature of 230° C. we introduced pure DEA while maintaining the sulphiding gas. After 30 minutes we fed hydrogen in while continuing the cooling. As soon as the total pressure reached $5 \times 10^5$ Pa we stopped the sulphiding injection (T = 180° C.) and slightly increased the hydrogen pressure up to a pressure of $28.32 \times 10^5$ Pa of hydrogen. The total pressure is $30 \times 10^5$ Pa.

The partial pressures are the following:

| | |
|---|---|
| n-heptane | $0.33 \times 10^5$ Pa |
| methane | $0.66 \times 10^5$ Pa |
| DEA | $0.02 \times 10^5$ Pa |
| hydrogen | $28.32 \times 10^5$ Pa |
| $H_2S$ | $0.66 \times 10^5$ Pa |
| (quinoline) | $0.002 \times 10^5$ Pa |

After a plateau of 2 hours at 150° C. we raised the temperature to 350° C. with a slope of 120° C./hour.

The feedstock flow rate is 12.0 ml/h, the hydrogen flow rate 50.0 l/h.

We used three mixtures containing respectively 0, 10% and 30% of quinoline in relation to diethylaniline.

We employed a catalyst bed containing 7% by weight of Ru/Ni on alumina, then a commercial catalyst, Procatalyse HR 348 (NiMo on doped alumina).

The results giving degrees of conversion of DEA in the presence of various concentrations of quinoline are shown in Table 1.

TABLE 1

| Cat | 0% QUINO | 10% QUINO | 30% QUINO |
|---|---|---|---|
| Ru/Ni/alumina r = 0.44 | 33.0 | 17.0 | 16.5 |
| HR 348 | 80.1 | 25.7 | 8.5 |

The results show that the Ru-Ni/alumina catalyst withstands the inhibition of the diethylaniline hydrodenitrogenation reaction by quinoline much better than the commercial catalyst.

EXAMPLE 3

(Use in a catalyst test on a model molecule: hydrogenation of biphenyl).

The reaction is carried out in the gaseous phase in a dynamic microreactor under pressure.

The catalyst is presulphided in the presence of an $N_2H_2S$ (15%) mixture, 4 hours at 400° C. or at 600° C.

The hydrogen gas-reactant is saturated with biphenyl in a saturator-condenser operating at the same pressure as the reactor. A system of capillaries ensures the stabilisation of the pressure and the decompression to atmospheric pressure. The analysis is carried out in a flame ionisation chromatograph. Measurements of the degrees of conversion to biphenyl make it possible to calculate the specific rates per gram of catalysts, $A_s$ by applying the relation:

$$A_s = Q_{BP} \times \text{degree of conversion}/m$$

$Q_{BP}$ = biphenyl flow rate   m: mass of catalyst

The operating conditions are the following:

$P_{total}$: $23 \times 10^5$ Pa;

$P_{BP}$: $8 \times 10^2$ Pa;

$P_{H_2S}$: $435 \times 10^2$ Pa;

m cat: 25 mg;

$Q_{BP}$: $5.7 \times 10^{-8}$ mol/s;

$Q_{H_2}$: $1.5 \times 10^{-4}$ mol/s.

The following table gives the specific activities at 530 K of the NiRu/Al$_2$O$_3$ catalyst (r=0.35) sulphided at 400° C. and 600° C., compared with those of the commercial NiMo/Al$_2$O$_3$ catalyst (HR 346).

TABLE 2

| Catalyst | As mol s$^{-1}$ g$^{-1}$ |
|---|---|
| NiRu/Al$_2$O$_3$ sulphided 400° C. | 5.3 × 10$^{-8}$ |
| NiRu/Al$_2$O$_3$ sulphided 600° C. | 5.6 × 10$^{-8}$ |
| HR 346 | 1.3 × 10$^{-8}$ |

These results show the very good activity of the NiRu/Al$_2$O$_3$ catalyst in the hydrogenation of biphenyl in the presence of a high H$_2$S pressure. This catalyst withstands the inhibition by H$_2$S much better than the commercial catalyst.

We claim:

1. A catalyst for hydrorefining hydrocarbon feedstocks, which comprises sulfides of ruthenium and of at least one other metal on a refractory oxide support wherein said one other metal comprises cobalt or nickel.

2. A catalyst of claim 1, comprising 1 to 15% by weight of metal.

3. A catalytic system comprising the catalyst of claim 1 in combination with a conventional hydrorefining catalyst.

4. A catalyst of of claim 1 comprising sulfides of ruthenium and one other metal.

5. A catalyst of claim 4, wherein the atomic ratio r defined as the content of atoms of the second metal/content of atoms of the second metal + content of atoms of Ru, is from 0.05 to 0.95.

6. A catalyst of claim 5, wherein the atomic ratio r is between 0.2 and 0.6.

7. A catalyst of claim 4 which contains ruthenium and nickel sulfides.

8. A catalyst of claim 1 wherein the refractory oxide comprises at least one refractory oxide selected from the group consisting of aluminium oxide zirconium oxide and titanium oxide.

9. A catalyst of claim 8, wherein the refractory oxide comprises an aluminium oxide.

10. A catalyst of claim 5 wherein r is from 0.1 to 0.7.

11. A catalyst of claim 5 which contains ruthenium and nickel sulfides.

12. A catalyst of claim 2 wherein the refractory oxide comprises at least one refractory oxide selected from the group consisting of aluminium oxide, zirconium oxide and titanium oxide.

13. A catalyst of claim 12 wherein the refractory oxide comprises aluminium oxide.

14. A catalyst of claim 1 comprising 5% to 10% by weight of metal.

15. A catalyst of claim 2 comprising sulfides of ruthenium and one other metal.

* * * * *